March 3, 1942.    L. A. KEIM    2,274,706
PROCESS OF MAKING A LIGHT POLARIZING MEDIUM
Filed April 11, 1939
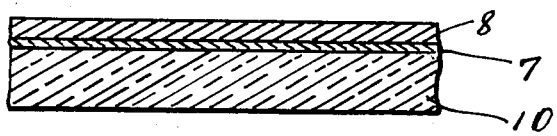
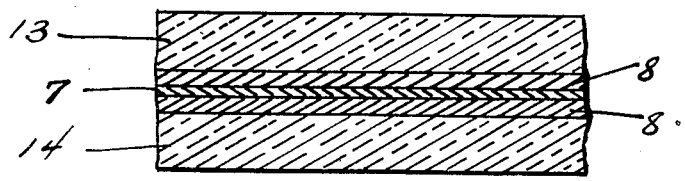
INVENTOR
LAURENCE A. KEIM
BY Olen E. Bee
ATTORNEY Patented Mar. 3, 1942

2,274,706

UNITED STATES PATENT OFFICE 2,274,706

PROCESS OF MAKING A LIGHT POLARIZING MEDIUM

Laurence A. Keim, Tarentum, Pa., assignor to Pittsburgh Plate Glass Company, Allegheny County, Pa., a corporation of Pennsylvania Application April 11, 1939, Serial No. 267,328

5 Claims. (Cl. 49—81.5)

The present invention relates to the provision of a sheet medium for polarizing light and it has particular relation to the provision of a medium of the foregoing type suitable for lamination with reinforcing and stiffening sheets of glass or similar material.

One object of the invention is to provide a composite light polarizing member which includes a transparent plastic material in sheet form having optically oriented polarizing crystals embedded therein, which member is susceptible of lamination with plate glass without disturbing the orientation or otherwise deleteriously affecting the polarizing crystals.

A second object of the invention is to provide a composite polarizing member of safety glass type which has relatively high resistance to shattering and to shock or impact over a relatively wide range of temperatures.

A third object of the invention is to provide a simple and convenient process of forming polarizing sheets of the foregoing type.

It has long been recognized that crystals of certain organic substances, such as Herapathite (iodo quinine sulfate) have the power of transmitting light vibrating in a single plane (that of their optical axes) while absorbing or cutting out light vibrating, in all other planes.

Such crystals in their natural form, are very thin and fragile, and it is impossible to obtain and preserve them in sizes useful for practical purposes. Accordingly, it has been proposed to provide suspensions of a large number of microscopic or sub-microscopic crystals in a suitable medium such as a solution of a cellulose acetate. Subsequently these solutions were flowed out in such manner that the minute crystals were all oriented to bring their optical axes into parallelism. When the solvents were removed from such films a sheet was obtained having light polarizing characteristics resulting from the aggregation of crystals corresponding to those of a single large crystal of the same surface area as the sheet. These sheets could be handled and manipulated without breakage and were suitable for many purposes. The process is described in E. H. Land Patent 2,041,138.

Among the uses suggested for such sheets was the provision of a non-glare system for overcoming headlight glare in automotive vehicles. In such system the lenses of the headlights of vehicles are provided with polarizing media having their optical axes inclined at an angle of 45° to the vertical but disposed in a plane perpendicular to the axis of the headlights. In front of the face of the driver is disposed a polarizing viewing member disposed with its axis extending in the same direction as that of the members on the headlights. When a car so equipped meets a car coming in the opposite direction and having similar equipment the plane of polarization of the light from the latter car is perpendicular to that of the viewing member and the glare is intercepted. A system of this type is described in detail in E. H. Land Patent 2,031,045.

Unfortunately, with conventional sheets of polarizing material embodying cellulose acetate or the like as a suspending medium for the polarizing crystals, difficulty has been encountered. This is true because in the lamination process, the particles or crystals of polarizing material suspended in the plastic when subjected to heat and pressure in order to effect lamination of glass tend to become deoriented, thus destroying the optical properties of the sheet. Likewise even after they have been laminated, it is found that the sheets become embrittled when subjected to low temperatures. Therefore, a glass member embodying conventional sheet polarizing media as plastic interlayers is subject to shattering by sudden impacts or blows at low temperatures, and is unsuitable from the standpoint of safety for use in vehicles.

In accordance with the provisions of the present invention a sheet polarizing member is provided including a thin film or layer of vinyl acetyl having polarizing crystals optically oriented therein and being further adhered to a backing or backings of plasticized polyvinyl acetal resin. A composite body of this type can readily be laminated with glass without deorientation or other disturbance of the polarizing crystals, and the resulting product has high resistance to shattering over a broad range of temperatures, far exceeding that of ordinary polarizing materials.

For a better understanding of the invention, reference may now be had to the accompanying drawing in which Figure 1 is a fragmentary sectional view of a light polarizing film having a backing and cushioning layer of vinyl acetal applied thereto.

Figure 2 is a fragmentary sectional view showing the sheet disclosed in Figure 1 applied to a sheet of glass.

Figure 3 is a fragmentary sectional view of a polarizing film having backing layers of vinyl acetal applied to both faces thereof.

Figure 4 is a fragmentary sectional view showing a safety glass construction embodying a laminated structure shown in Figure 3, but showing sheets of protective glass upon both sides thereof.

In the drawing like numerals refer to like parts throughout.

In the preparation of a polarizing film a solution of vinyl acetal resin is first prepared. This solution may contain vinyl acetal resin of safety glass grade or type embodying the polymerized product obtained by reaction of hydrolyzed vinyl acetate and butyraldehyde. Acetylization of the acetate and aldehyde may be substantially 69 per cent complete and preferably the molecular weight will be approximately within a range of 15,000 to 25,000 as determined by the conventional Staudinger formula. The preparation of a resin of this type is disclosed in E. W. Reid Patent 2,120,628. The resin is dissolved in a solvent such as methyl alcohol and is plasticized with about 25–50, e. g. 32 per cent of a water insoluble plasticizer, such as castor oil, diethyl phthalate, dibutyl sebacate or triethylene glycol dihexoate.

In order to form a polarizing medium submicroscopic crystals of a material such as Herapathite (iodo quinine sulfate) or iodo cinchonine sulfate are added thereto and the material is then caused to flow past a knife edge upon a supporting surface such as a sheet of cellulose acetate. As a result the axes of the polarizing crystals are suitably oriented, and when the solvents are evaporated, a film is obtained which possesses the desired optical properties. It will be appreciated that it is also possible to flow the solution containing the suspended crystals past an edge upon a sheet of glass in order to provide a light polarizing body.

Films of vinyl acetal containing polarizing crystals distributed therein may be obtained in thickness of about .001 of an inch. These thicknesses may of course vary over a considerable range. The sheets are supported upon a temporary backing of cellulose acetate which may be of substantially any desired thickness, e. g. .005 of an inch. Transfer of the polarizing film from the temporary backing to a permanent backing may be effected by superposing upon the film a sheet of vinyl acetal of the grade employed as an interlayer in safety glass and of desired thickness, e. g. .005 to .025 of an inch. The film may be plasticized with diethylene glycol dihexoate or other plasticizer. The plasticized film is covered with a layer of non-adhesive material such as Cellophane or an additional sheet of cellulose acetate and is run between rollers in order to force out air. Subsequently the assembly is placed in a conventional vacuum press at a temperature of about 235° and pressed at 10 lbs. air pressure for a period of about 1 minute. The assembly is then cooled down to about 50 or 20° F. at which temperature the cellulose acetate film may be stripped away leaving the polarizing film upon the vinyl acetal backing.

The body as obtained comprises a film 7 of vinyl acetal containing polarizing crystals dispersed in an optically oriented position therein, upon a backing 8 of vinyl acetal free of crystals. It is quite flexible and may be readily adhered directly (without cement) but under heat and pressure, to glass. A glass sheet may be applied without cement to the surface of the polarizing film or the film, together with its backing may be sandwiched between two sheets of glass and then laminated by direct application of fluid pressure in an autoclave in accordance with conventional practice, in forming safety glass. In such process the fluid may be ethylene glycol and the temperature of the fluid is about 120° C. The pressure is about 150 lbs. per sq. inch. The temperature is gradually reduced to about 70° C. after which the autoclave may be opened and the body subsequently cooled. A completed sheet of this type is illustrated in Figure 2 in which a supporting sheet of glass is indicated at 10 and supports the backing film 7 of vinyl acetal and intermediate polarizing film 8.

In the embodiment of the invention disclosed in Figure 3 the assembly comprising the backing layer of vinyl acetal and the polarizing layer as shown in Figure 1 after it is stripped from the cellulose acetate is further provided with a facing layer 11 of vinyl acetal by a suitable pressing operation under heat. The conditions involved are the same as those involved in application of sheet 8.

In Figure 4 is shown an assembly in which the composite plastic inner layer shown in Figure 3 is assembled between upper and lower plates 13 and 14 of glass by the process above described.

A plate prepared as above described is excellent as a safety glass because it is characterized by great resistance to shattering, even at temperatures of zero degrees F. or lower, and also retains a relatively high degree of resistance at temperatures up to or above 100° F. At the same time the optical properties of the polarizing film are substantially unimpaired.

Sheets or plates embodying the new polarizing material as a bonding agent may be employed as windshields or as sections of windshields. They may be cut to provide visors and glare screens which are supported back of the windshields upon suitable brackets. A small unit of material such as is shown in Figure 2 or 3 and embodying an exposed backing 8 of vinyl acetal may be adhered to a windshield by pressing it under heat against the latter, or by wetting it with a solvent, or by coating it with a cement and then pressing it into position. Plates such as shown in Figure 2 or 4 may be formed into headlight lenses or may be applied to or employed in conjunction with the lenses of headlights, to provide sources of polarized light. Of course the material shown in Figures 2 and 4 may be employed to fabricate goggles and for other purposes.

The forms of the invention herein disclosed are to be considered merely as representative and it will be apparent that numerous modifications may be made therein without departure from the spirit of the invention or the scope of the appended claims.

What I claim is:

1. A process of preparing a light polarizing member which comprises forming a solution of vinyl acetal resin containing light polarizing crystals distributed therein, flowing the solution upon a temporary backing to provide a film containing the light polarizing crystals in optically oriented position, evaporating the solvents from the film, directly contacting the film with a sheet of vinyl acetal resin and transferring the film under heat and pressure to the surface of the sheet and stripping away the temporary backing.

2. A process as defined in claim 1 in which a sheet of vinyl acetal resin is subsequently applied on the remaining face of the transferred film.

3. A process of preparing a light polarizing member, which process comprises directly contacting a sheet of vinyl acetal plastic, which is free of light polarizing particles, with a film of vinyl acetal plastic containing optically oriented light polarizing particles distributed therethrough, the film being secured upon a temporary backing comprising a sheet of plastic material, the contact between the film and said sheet of vinyl acetal plastic being effected under heat and pressure, whereby the film is caused to adhere to the vinyl acetal sheet, then cooling and stripping away the temporary backing sheet to leave the film adherent to the vinyl acetal.

4. A process as defined in claim 3 in which the temporary backing layer comprises a cellulose ester.

5. A process as defined in claim 3 in which a cover layer of vinyl acetal is applied over the polarizing film subsequent to the transfer of the latter to the first-mentioned vinyl acetal layer.

LAURENCE A. KEIM.